United States Patent [19]

Uehara et al.

[11] 3,885,756

[45] May 27, 1975

[54] AUTOMATIC THREADING APPARATUS

[75] Inventors: Seigo Uehara; Jin Yamagishi, both of Kanagawa, Japan

[73] Assignee: Sony Corporation, Tokyo, Japan

[22] Filed: Mar. 2, 1973

[21] Appl. No.: 337,443

[30] Foreign Application Priority Data

Mar. 7, 1972 Japan .......................... 47-27625

[52] U.S. Cl. .................. 242/195; 226/91; 242/187; 242/188

[51] Int. Cl. ........................................... G11b 15/66

[58] Field of Search ........... 242/195, 188, 187, 210, 242/192; 226/91, 92, 43, 11

[56] References Cited

UNITED STATES PATENTS

| | | | |
|---|---|---|---|
| 3,473,042 | 10/1969 | Orlando | 242/195 |
| 3,598,926 | 8/1971 | Umeda | 242/195 |
| 3,758,009 | 9/1973 | Magahiro | 242/195 |
| 3,797,776 | 3/1974 | Umeda et al. | 242/195 X |

FOREIGN PATENTS OR APPLICATIONS

| | | | |
|---|---|---|---|
| 43-12698 | 5/1968 | Japan | 242/187 |

*Primary Examiner*—George F. Mautz
*Attorney, Agent, or Firm*—Lewis H. Eslinger; Alvin Sinderbrand

[57] ABSTRACT

In an apparatus for automatically threading a tapelike member, for example, the magnetic tape in a video tape recorder, along a predetermined tape path from a supply reel to a take-up reel; the tape has a leader which is distinguishable therefrom, for example, by its transparency; and the automatic threading apparatus has a sensing device adjacent the tape path for detecting the arrival of the tape itself following the leader, and a timed control circuit responsive to the sensing device for halting the tape threading operation in the event that the arrival of the tape is not detected by the sensing device a predetermined time after the threading operation is initiated. In the rewind mode of operation of the apparatus, that is, the relatively high speed transfer of the tape from the take-up reel back to the supply reel, the sensing device detects the arrival of the leader and the time control circuit halts the rewinding operation a predetermined time after detection of the leader, which time is substantially shorter than the previously mentioned time for halting the threading operation. Further, during normal forward mode of operation, as for recording or reproducing signals on the tape, the sensing device detects the arrival of the terminal end of the tape which is also distinguishable, for example, by being transparent, and, in response thereto, the normal forward transport of the tape from the supply reel to the take-up reel is halted.

14 Claims, 3 Drawing Figures

PATENTED MAY 27 1975 3,885,756

SHEET 2

AUTOMATIC THREADING APPARATUS

BACKGROUND OF THE INVENTION

1. Field of the Invention

This invention relates generally to an automatic threading apparatus for a tape-like member, for example, a magnetic tape or film on which video and/or audio signals or motion pictures are recorded for subsequent reproduction or projection, respectively, and this invention is particularly directed to an improved apparatus by which a leader extending from one end of the tape-like member and being distinguishable therefrom is automatically threaded along a predetermined path from a supply reel on which the tape-like member is originally wound to a take-up reel, and in which the automatic threading operation and the subsequent transportation of the tape-like member between the reels are controlled, at least in part, by distinguishing between the tape-like member and the leader extending therefrom.

2. Description of the Prior Art

In existing devices utilizing a tape-like member, as described above, it is the usual practice to withdraw the free end of the tape-like member from the supply reel on which it is wound, and to manually thread the withdrawn end portion of the tape-like member along the necessary path defined by various guides prior to connecting such end portion to the take-up reel. Thus, for example, in existing video tape recorders, hereinafter referred to as VTRs, the free end of the magnetic tape is withdrawn from the supply reel and manually threaded past an erase head and about the tape guide drum containing a rotary head assembly prior to being further manually threaded past an audio and control signal head and between a capstan and pinch roller assembly and then finally attached to the take-up reel. In effecting such manual threading of the magnetic tape, care must be taken to ensure that the tape is made to follow the necessary tape path, and particularly that the tape is precisely located relative to the tape guide drum. Moreover, such manual threading requires considerable handling and manipulation of the magnetic tape and also access to the interior of the video tape recorder which is best kept covered for protection from dust and dirt and from physical damage to its working parts. The foregoing considerations are particularly pertinent in the case of VTRs intended for home use, and hence likely to be operated by relatively unskilled users who may improperly thread the tape or cause damage to the internal components of the recorder when effecting the manual threading operation. Accordingly, it is desirable to provide a VTR with an apparatus that automatically effects the proper threading of the tape therein. However, such automatic or self-threading of the tape is difficult to achieve while retaining the standard layout or relative positioning of the VTR components, such as, the tape guide drum containing the rotary head assembly, the erasing and audio heads, and the capstan and pinch roller assembly for driving or transporting the tape during normal recording or reproducing operations. Further, it is difficult to achieve the automatic or self-threading of the magnetic tape without adversely affecting the desired tension to be maintained in the tape, and the transportation of the tape at the conventional speed during the recording and reproducing operations. Previous attempts to provide an automatic, self-threading apparatus for VTRs have been disadvantageously characterized by the use of other than standard widths of video recording tape and/or by unreliable threading operation, that is, relatively frequent occurrences of improper threading. Further, when such improper threading occurs, the previously proposed automatic or self-threading apparatus are incapable of preventing or aborting further or continued operation with the result that the tape is damaged or even severed.

SUMMARY OF THE INVENTION

It is an object of this invention to provide an improved automatic, self-threading apparatus for a tape-like member.

A more specific object is to provide an automatic, self-threading apparatus which is particularly suited for incorporation in a video tape recorder and the like.

A further object is to provide an automatic, self-threading apparatus, as aforesaid, which avoids erroneous threading of the tape-like member, and more particularly which prevents further operation in the event that correct threading is not achieved.

It is still another object of this invention to provide an automatic, self-threading apparatus, as aforesaid, in which a leader distinguishable from the tape-like member is detected for controlling the transportation of the tape-like member during automatic threading and also during other operations, for example the rewinding of the tape-like member from the take-up reel onto the supply reel.

It is a still further object of this invention to provide an automatic, self-threading apparatus, as aforesaid, in which the automatic threading operation is automatically stopped or aborted in the event that the completion of automatic threading is not attained within a predetermined time period, as would be the case in the event of improper threading.

In accordance with an aspect of this invention, an apparatus for automatically threading a tape-like member having a leader extending from at least one end and being distinguishable from the tape-like member comprises tape drive means for transporting the leader and tape-like member in succession along a predetermined tape path, for example, from a supply reel on which the tape-like member is originally wound to a take-up reel, tape sensing means for distinguishing between the presence, at a location adjacent the tape path, of the leader and the tape-like member and providing first and second indications, respectively, and timing means energized in response to the first indication from the sensing means and being operative to discontinue the operation of the tape drive means in the event that such first indication persists for longer than a predetermined time period follwing the initiation of operation of the tape drive means.

The above, and other objects, features and advantages of this invention, will be apparent from the following detailed description of an illustrative embodiment which is to be read in connection with the accompanying drawings.

DESCRIPTION OF THE PREFERRED EMBODIMENT

Figure 1:
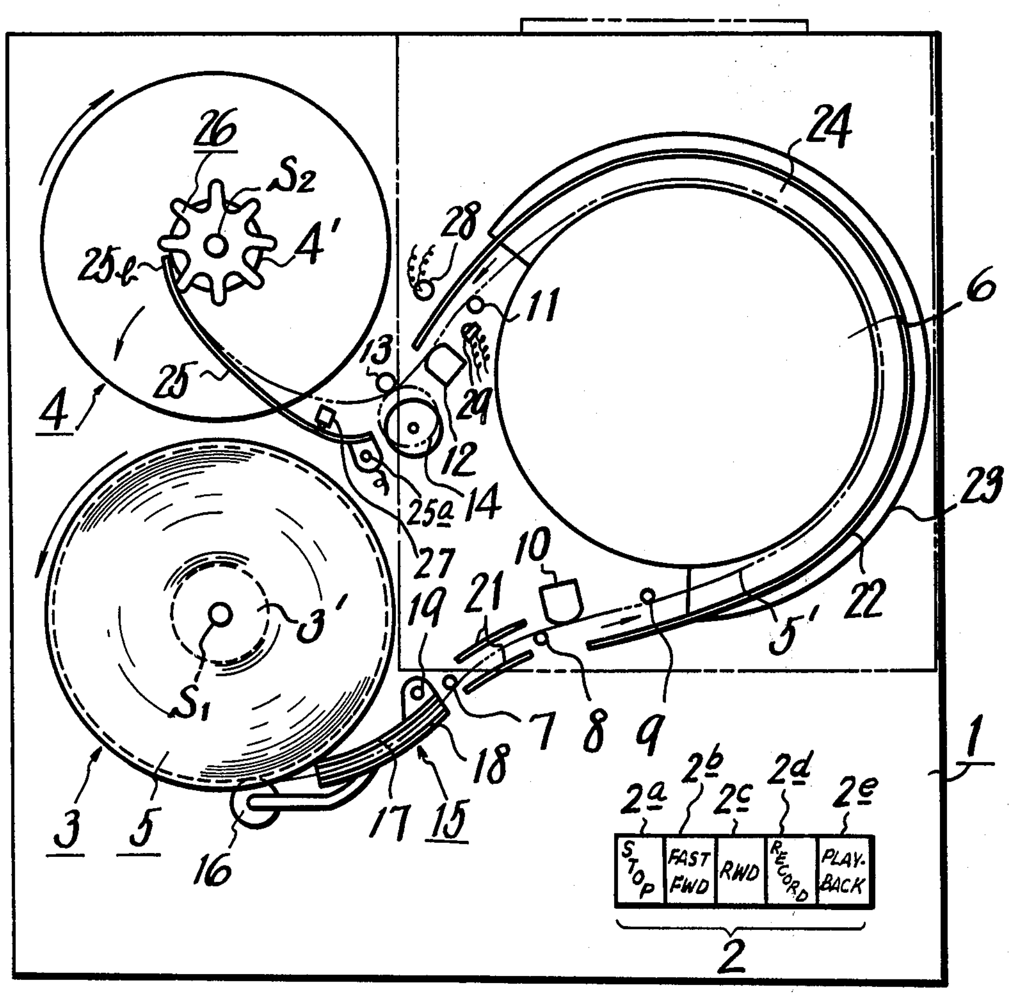
FIG. 1 is a schematic top plan view of a video tape recorder provided with an automatic, self-threading apparatus in accordance with an embodiment of this invention, and which is shown in the condition for effecting a threading operation.

Referring in detail to FIG. 1, it will be seen that an automatic, self-threading apparatus in accordance with this invention is there shown applied to a VTR having a chassis of base panel 1 on which there is mounted a group or assembly 2 of mode or function selecting pushbuttons. As shown, the assembly 2 may comprise pushbuttons for selecting the usual operating modes of a VTR, for example, a pushbutton 2*a* for stopping the operation of the recorder, a pushbutton 2*b* for effecting the fast forwarding of the tape from a supply reel 3 on which the tape is originally wound, as at 5, to a take-up reel 4, a pushbutton 2*c* for selecting the fast rewinding of the tape from takeup reel 4 onto supply reel 3, a pushbutton 2*d* for selecting the recording operation during which the tape is transported at the usual relatively slow speed from supply reel 3 to take-up reel 4, and a pushbutton 2*e* for effecting the reproducing or playback operation during which the tape is again transported at the relatively slow speed from supply reel 3 to takeup reel 4.

As shown, the VTR provided with an automatic, self-threading apparatus according to this invention has the usual components arranged in a conventional layout. Such components include shafts $S_1$ and $S_2$ projecting above panel 1 and on which the hubs 3' and 4' of the supply and take-up reels, respectively, are suitably secured for rotation with the respective shafts. In order to effect the recording or playback operations of the VTR, the tape 5 on supply reel 3 has to be threaded in a tape path indicated in broken lines at 5' extending from supply reel 3 around a tape guide drum 6 and then to take-up reel 4. Between supply reel 3 and tape guide drum 6, the tape path 5' is defined by guide pins 7, 8 and 9 which lead the tape past an erasing head 10 and, between tape guide drum 6 and take-up reel 4, the tape in path 5' is led by a guide pin 11 past a head 12 for recording and reproducing audio and/or control signals on the tape, and then between a capstan 13 and a pinch roller 14 which, when pressed against capstan 13, as indicated in broken lines on FIG. 1, cooperates with the capstan for effecting the transportation of the tape about guide drum 6 at the usual relatively slow speed employed for recording and playback operations. The tape guide drum 6 may include the usual upper and lower sections defining a circumferential gap therebetween through which a rotary head assembly (not shown) contained within drum 6 can project for tracing or scanning oblique tracks on the tape 5 extending around drum 6 and for conventionally recording or reproducing video signals in such oblique tracks.

The VTR adapted to be provided with an automatic, self-threading apparatus according to this invention has a conventional transmission assembly (not shown) controllable by actuation of the mode selecting pushbuttons 2*a*-2*e* for suitably driving reels 3 and 4 and capstan 13 from an electric driving motor 58 (FIG. 3), and including the usual clutch (not shown) or the like which is engaged when any one of pushbuttons 2*b*-2*e* is actuated and disengaged in response to actuation of the "stop" pushbutton 2*a* for halting the driving of reels 3 and 4 and capstan 13. Thus, during a fast forward operation or a recording or playback operation selected by actuation of pushbuttons 2*b*, 2*d* or 2*e*, respectively, reels 3 and 4 are rotated in the directions indicated by the arrows on FIG. 1 and capstan 13 is rotated in the clockwise direction for unwinding the tape from supply reel 3 and rewinding the tape on take-up reel 4. When a rewind operation is selected by actuation of pushbutton 2*c*, the directions of rotation of reels 3 and 4 are reversed so that the tape is unwound from take-up reel 4 and rewound on supply reel 3. The VTR further has a conventional mechanism (not shown) for moving pinch roller 14 against capstan 13, as shown in broken lines on FIG. 1, only when a recording or playback operation is selected by actuation of pushbutton 2*d* or 2*e*, respectively, so that capstan 13 and pinch roller 14 then cooperate to drive the tape 5 about guide drum 6 at a controlled speed.

Figures 2, 3:
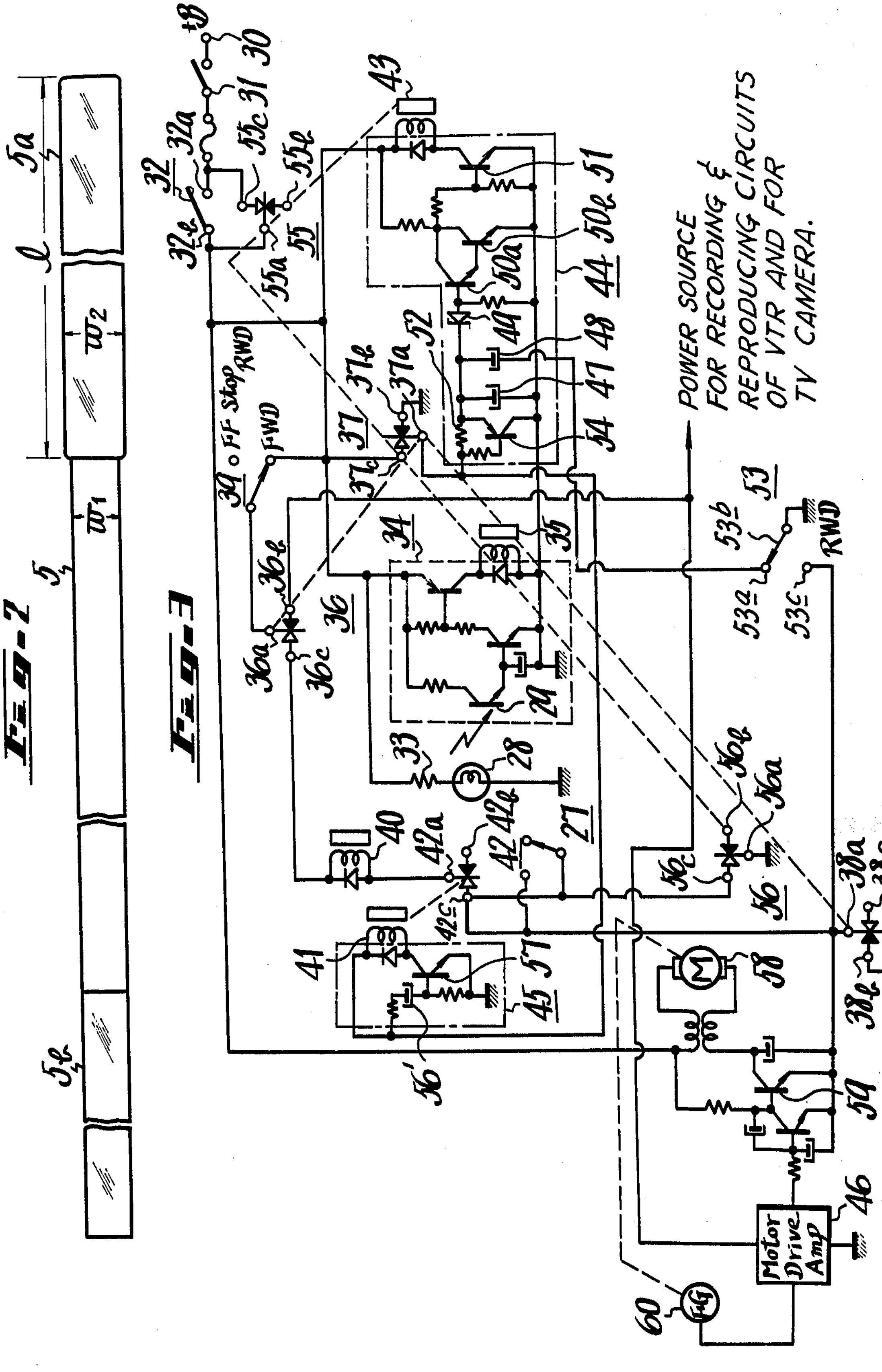
FIG. 2 is a fragmentary elevational view of a tape-like member intended for use in connection with the automatic, self-threading apparatus embodying this invention, and showing the leader and trailing end portion of such tape-like member which are distinguishable from the latter.
FIG. 3 is a schematic diagram showing various circuits for controlling the operation of the automatic, self-threading apparatus employing this invention.

As shown on FIG. 2, the tape 5 to be used in connection with an automatic, self-threading apparatus according to this invention has a leader 5*a* with a length *l*, for example, 1 meter, that is substantially longer than the distance along tape path 5' from supply reel 3 to take-up reel 4. The material of leader 5*a* is selected so as to be distinguishable from that of tape 5. Thus, when the tape 5 is composed of a plastic film material having an opaque magnetic coating thereon, the leader 5*a* is distinguished from tape 5 by being made transparent. Further, the leader 5*a* is made to be less flexible than tape 5, for example, by being formed of a relatively thicker plastic film material, so that such leader may be self-propelled, as hereinafter described, from supply reel 3 along tape path 5' to take-up reel 4 in response to rotation of supply reel 3. As shown, the width $W_2$ of leader 5*a* is preferably made slightly greater than the width $W_1$ of tape 5 so that, when the tape 5 and leader 5*a* are wound on supply reel 3, the turns of tape 5 will fit, with suitable clearance, between the flanges of supply reel 3, while turns of the relatively wider leader 5*a* will be wound on the peripheral or edge portions of such flanges which may be beveled. The tape 5 is further shown on FIG. 2 to have a terminal end portion 5*b*, that is, an end portion affixed to the hub 3' of supply reel 3, which terminal end portion 5*b* is of the same width as tape 5 but distinguishable from the latter in the same manner as leader 5*a*. Thus, in the embodiment being described, the terminal end portion is made transparent, for example, merely by having the opaque magnetic coating omitted therefrom so that the remaining plastic film material will be transparent and have the same flexibility as the remainder of tape 5. The terminal end portion 5*b* of the tape preferably has a length for example, of 3 meters, substantially larger than the length *l* of leader 5*a*.

Referring again to FIG. 1, it will be seen that the automatic, self-threading apparatus according to this invention, as there shown, comprises a leader guiding arm assembly 15 mounted on panel 1 adjacent supply reel 3 for removing or peeling the free end of leader 5*a* from the periphery of supply reel 3 and for directing or guiding the leader toward guide pin 7. The arm assembly 15 is shown to include a freely rotatable roller 16 which, during a threading operation, bears against the outer turn of leader 5a for increasing the frictional contact of the successive turns of the leader with each other so that, as supply reel 3 is turned in the counterclockwise direction, the leader turns will rotate, as a unit, with the supply reel and lossening of the leader turns will be avoided. Arm assembly 15 further includes a peeling blade 17 which, during the threading operation, has its end edge engaged with the outermost turn of the leader on supply reel 3 for peeling the free end of the leader from the periphery of the supply reel and directing such free end of the leader into a channel defined between peeling blade 17 and an outer guiding blade 18. The arm assembly 15 is turnably mounted on a vertical shaft 19 extending above panel 1 and being movable longitudinally, that is, parallel to the supply reel shaft $S_1$, for disposing arm assembly 15 in its operative position at the level of supply reel 3 during the threading operation, as shown on FIG. 1, and for displacing arm assembly 15 downwardly relative to supply reel 3 when the tape threading operation is completed. A spring (not shown) may act on arm assembly 15 to urge roller 16 toward the periphery of supply reel 3 when arm assembly 15 is in its operative position during the tape threading operation, and a cam or other suitable structure (not shown) may be provided for turning arm assembly 15 about shaft 19 in the counterclockwise direction upon downward displacement of arm assembly 15 at the completion of the tape threading operation, whereby to space roller 16 from the periphery of the supply reel. The elevation of arm assembly 15 to its operative position may be effected by a suitable mechanical linkage (not shown) upon energization of a solenoid 40 (FIG. 3) as hereinafter described in detail, and the return of arm assembly 15 downwardly and outwardly to its inoperative or rest position occurs upon the deenergizing of that solenoid.

Since leader 5a is substantially less flexible than the tape 5 itself, the leader resiliently tends to assume a straight condition and thus can be propelled longitudinally along path 5' in response to the rotation of supply reel 3 during the tape threading operation. As the leading end of leader 5a issues from the channel defined between blades 17 and 18, the free end of the leader is directed from guide pin 7 to guide pin 8 between spaced guide plates 21. After passing erasing head 10 and guide pin 9 the leader is made to bend around guide drum 6 by means of a guide band 22 which is spaced from, and extends about guide drum 6 and has a shelf or flange 23 along its lower edge for supporting the leader as the latter moves through the gap or clearance 24 between guide band 22 and the periphery of drum 6. After the free end of leader 5a issues from gap 24 and moves past guide pin 11 and audio head 12 and then between capstan 13 and pinch roller 14, the free end of the leader is engaged and deflected by an arcuate guiding and detecting arm 25 disposed adjacent take-up reel 4 and being urged to the operative position shown on FIG. 1 during the tape threading operation. As shown, arm 25 may be turnably mounted, at one end, on a shaft 25a extending upwardly from panel 1 and is suitably connected with the armature of solenoid 40, preferably by means of a spring (not shown), so that, when solenoid 40 is energized, arm 25 is biased in the clockwise direction, as viewed on FIG. 1, to engage its free end 25b against the peripheral surface of hub 4' of the take-up reel. Take-up reel 4 is shown to have a star-shaped spring 26 secured on the upper surface of its hub 4' so that, as the free end of the leader 5a is directed against the periphery of hub 4' by arm 25 during the tape threading operation, the fingers of star-shaped spring 26 catch the free end of the leader and hold the latter against hub 4' for winding the leader about such hub as take-up reel 4 is turned in the clockwise direction, as viewed on FIG. 1. When solenoid 40 is deenergized, arm 25 is angularly displaced in the counterclockwise direction from the position shown on FIG. 1 so as to move to a rest or inoperative position in which its free end 25b is substantially spaced from hub 4' and from any turn of leader 5a and tape 5 that may be wound on the take-up reel.

A normally open micro-switch 27 is mounted adjacent arm 25 so as to be actuated by the latter for closing switch 27 only when arm 25 is moved to its fully operative position shown on FIG. 1 with its free end 25b against hub 4'.

FIG. 1 further shows the automatic, self-threading apparatus according to this invention to comprise a sensing means including a light source 28 and a photosensitive element 29, for example, constituted by a photo-transistor, disposed at opposite sides of tape path 5' at a location that is preferably adjacent take-up reel 4, for example, between guide pin 11 and audio head 12, as shown. It will be apparent that the photosensitive element 29 receives light from source 28 only when the opaque tape 5 is not present at the respective location along path 5', that is, only when the transparent leader 5a or the transparent trailing end portion 5b is interposed between source 28 and element 29 or when the tape 5 and leader 5a are fully wound on supply reel 3.

Referring now to FIG. 3, it will be seen that the circuits for controlling the various operations of the VTR provided with an automatic, self-threading apparatus according to this invention may comprise a terminal 30 to which there is connected a DC electric power source +B. Terminal 30 is connected through an ON-OFF switch 31 to the fixed contact 32a of a control switch 32 having its movable contact 32b suitably actuated by the function selecting pushbuttons 2a-2e so that switch 32 is in its closed condition only when the VTR is in its stopped state. Thus, switch 32 is opened upon the actuation of any one of the mode or function selecting pushbuttons 2b-2e for initiating the respective operation of the VTR. The movable contact 32b of switch 32 is shown to be connected through a resistor 33 to light source 28 and also to a detecting circuit 34 which includes photo-transistor 29. The detecting circuit 34 is arranged to energize a relay 35 only when phototransistor 29 receives light from light source 28, that is, only when transparent leader 5a or trailing end portion 5b of the tape is disposed between source 28 and photo-transistor 29, or when neither the leader nor tape is present in path 5' between source 28 and phototransistor 29, for example, prior to the initiation of the tape threading operation. The relay 35 has three switches 36, 37 and 38 associated therewith, and such switches include movable contacts 36a, 37a and 38a which normally engage fixed contacts 36b, 37b and 38b, respectively, when relay 35 is deenergized. When relay 35 is energized, the movable contacts of switches 36, 37 and 38 are changed over to engage normally disengaged contacts 36c, 37c and 38c, respectively.

DC power from the movable contact 32b of switch 32 is supplied to movable contact 36a of switch 36 by way of a switch 39 which is suitably actuated from the mode or function selecting pushbuttons 2*a*-2*e* so that switch 39 is closed only upon actuation of either the pushbutton 2*d* or the pushbutton 2*e* for selecting the recording operation or the playback operation, respectively, of the VTR. The normally disengaged contact 36*c* of switch 36 is connected to one end of the coil of solenoid 40, which coil has its other end connected to the movable contact 42*a* of a switch 42 operable by a relay 41 and having a normally engaged fixed contact 42*b* which is open-circuited, and a normally disengaged fixed contact 42*c* which is engaged by movable contact 42*a* only upon energizing of solenoid 41. The movable contact 42*a* of switch 42 is connected to the movable contact 38*a* of switch 38 which has its normally engaged contact 38*b* connected to a reference potential, for example, to ground as shown, while the normally disengaged contact 38*c* is open-circuited. The normally engaged contact 36*b* of switch 36 is shown to be connected to a motor drive amplifier 46 to supply power to the latter only when relay 35 is deenergized, and the fixed contact 36*b* further provides a source of power for the conventional recording and reproducing circuits, not shown, included in the VTR and, if desired, also for a TV camera, not shown, which may be associated with the VTR when the latter is performing a recording operation. The normally disengaged contact 37*c* of switch 37 has power supplied thereto from the movable contact 32*b* of switch 32, while the normally engaged contact 37*b* is connected to ground and the movable contact 37*a* is connected to a timing and control circuit 44 for a relay 43 and also to a control circuit 45 for the previously mentioned relay 41 so that power is supplied to the circuits 44 and 45 only when relay 35 is deenergized to cause engagement of contacts 37*a* and 37*c* in switch 37.

The circuit 44 is shown to include a timing arrangement constituted by capacitors 47 and 48 and by a Zener diode 49 which detects a predetermined level of charge on one or both of the capacitors 47 and 48. Circuit 44 further includes switching transistors 50*a* and 50*b* which are made conductive to shunt or remove the base bias from a control transistor 51 only when Zener diode 49 is made conductive, that is, detects the predetermined charge level on one or both of capacitors 47 and 48. The relay 43 is connected in series with the collector-emitter of control transistor 51 to the movable contact 32*b* of switch 32, and transistor 51 is turned on to cause energizing of relay 43 except when switching transistors 50*a* and 50*b* are switched or turned ON by Zener diode 49. The positive terminals of capacitors 47 and 48 are connected through a resistor 52 to movable contact 37*a* of switch 37, and the negative terminal of capacitor 47 is permanently connected to a reference potential, such as ground. The negative terminal of capacitor 48 is connected to a fixed terminal 53*a* of a switch 53 having its movable contact 53*b* connected to ground. The switch 53 is suitably actuated from the mode or function selecting pushbuttons 2*a*-2*e* so that movable contact 53*b* engaged fixed contact 53*a*, as shown, for connecting capacitor 48 in parallel with capacitor 47 whenever any one of the pushbuttons 2*a*, 2*b*, 2*d* and 2*e* is actuated for selecting the respective operation of the VTR. On the other hand, when pushbutton 2*c* is actuated for selecting the rewind operation of the VTR, movable contact 53*b* is made to engage fixed contact 53*c*, thereby disconnecting capacitor 48 from the timing circuit and, at the same time, connecting the movable contact 38*a a*of switch 38 to ground through switch 53.

A PNP type transistor 54 is further connected in circuit 44 between the positive terminals of capacitors 47 and 48 and ground, that is, transistor 54 has its emitter-collector connected in parallel with capacitors 47 and 48, while the base of such transistor is connected to the movable contact 37*a* of switch 37. Thus, when relay 35 is deenergized to cause engagement of movable contact 37*a* with the fixed contact 37*b* connected to ground, transistor 54 is made conductive to form a discharging path for the capacitors 47 and 48.

The relay 43 controlled by circuit 44 in turn controls associated switches 55 and 56 having movable contacts 55*a* and 56*a* normally engaging fixed contacts 55*b* and 56*b*, respectively, when relay 43 is deenergized, and being simultaneously changed over to engage fixed contacts 55*c* and 56*c* when relay 43 is energized. As shown, switch 55 is connected in parallel with switch 32, that is, normally engaged contact 55*b* is open circuited, fixed contact 55*c* is connected to fixed contact 32*a*, and movable contact 55*a* is connected to movable contact 52*b*. Thus, switch 55 provides an alternative path for supplying power to the circuits whenever relay 43 is energized. In the case of switch 56, its movable contact 56*a* is connected to ground, its normally engaged contact 56*b* is open circuited, and its normally disengaged contact 56*c* is connected to the normally disengaged contact 42*c* of switch 42 and also, by way of the normally open micro-switch 27 to the movable contacts 38*a* and 42*a* of switches 38 and 42.

The control circuit 45 for relay 41 is shown to comprise a differentiation circuit including a capacitor 56' and a transistor 57 which is controlled by the output of such differentiation circuit to cause energizing of relay 41 and the consequent actuation of switch 42, only for a predetermined relatively short time period, for example, one second, after power is initially supplied to circuit 45 through switch 37.

The movable contact 32*b* of control switch 32 is further shown to be connected to the positive terminal of the DC variable speed driving motor 58 which has its negative terminal connected through the collector-emitter of a control transistor 59 to the movable contact 38*a* of switch 38. The rotational speed of motor 58 is detected by a frequency generator 60 having its output supplied to motor drive amplifier 46 so that, when amplifier 46 is energized or powered by way of switch 36, the collector-emitter impedance of transistor 59 is controlled by the output of amplifier 46 to cause the motor 58 to rotate at a predetermined constant relatively slow speed. However, when relay 35 is energized to change over switch 36 so that motor drive amplifier 46 is no longer energized, the collector-emitter impedance of transistor 59 is reduced to a minimum value to permit operation of motor 58 at a relatively high speed.

The VTR provided with an automatic, self-threading apparatus in accordance with this invention, as described above, operates as follows:

Assuming that the VTR is initially in its stopped condition in which switch 32 is closed, and further that tape 5 and its leader 5*a* are fully wound on supply reel 3, then closing of power switch 31 causes energizing of light source 28 through switch 32. Since the opaque tape 5 is not interposed between light source 28 and photo-transistor 29, the latter is energized by light from such source, and circuit 34 causes energizing of relay 35 with the result that the associated switches 36, 37 and 38 are changed over to engage their movable contacts 36*a*, 37*a* and 38*a* with fixed contacts 36*c*, 37*c* and 38*c*, respectively. Upon such changing over of switch 37, power is supplied therethrough to circuit 44 for commencing the gradual charging of capacitors 47 and 48 at a charging rate, or in accordance with a time constant determined by such capacitors and the resistor 52. During such charging of capacitors 47 and 48 Zener diode 49 is non-conductive so that switching transistors 50*a* and 50*b* are also non-conductive with the result that control transistor 51 is conductive for causing energizing of relay 43. As a result of the energizing of relay 43, switches 55 and 56 are simultaneously changed over to engage their movable contacts 55*a* and 56*a* with their fixed contacts 55*c* and 56*c*, respectively. Thus, switch 55 forms a path for the operating current parallel to control switch 32.

RECORDING OR PLAYBACK OPERATION

If either the pushbutton 2*d* or the pushbutton 2*e* is actuated to select a recording or playback operation, respectively, of the VTR, control switch 32 is open, but power continues to be supplied to the circuits shown on FIG. 3 through switch 55 so long as relay 43 continues to be energized. It will be seen that simultaneously with the supplying of power to circuit 44 through switch 37 power is also supplied to circuit 45 for energizing relay 41 and thereby changing over switch 42 so that its movable contact 42*a* engages fixed contact 42*c*. Thus, a circuit is completed for energizing solenoid 40 through switches 31, 55, 39 and 36 up to solenoid 40, and from the latter through contacts 42*a* and 42*c* of switch 42 and through contacts 56*c* and 56*a* of switch 56 to ground. As a result of energizing of solenoid 40, the tape guiding arm assembly 15 is moved to its operative position, and the guiding and detecting arm 25 can be similarly moved fully to its operative position, by reason of the absence of tape wound on take-up reel 4 so as to cause closing of the normally open micro-switch 27. Thus, although circuit 45 energizes relay 41 for only a short period of time, for example, for one second, so as to initiate energizing of solenoid 40, during that short period of time the arm 25 can cause closing of microswitch 27 if arm 25 does not detect the presence of tape wound on the take-up reel. When microswitch 27 is thus closed, the deenergizing of relay 41 does not interrupt the energizing of solenoid 40, as the energizing circuit for the solenoid is then completed from movable contact 42*a* of switch 42 through closed micro-switch 27 and through engaged contacts 56*c* and 56*a* of switch 56 to ground.

It will be noted that, at the same time, a circuit for energizing motor 58 is completed through switches 31 and 55 to motor 58 and from the latter through switches 27 and 56 to ground so that motor 58 is operated. However, since relay 35 is energized to change over switch 36, the circuit for energizing the motor drive amplifier 46 is interrupted at switch 36 so that the servo system for the motor constituted by amplifier 46 and frequency generator 60 is inoperative and motor 58 is operated at a relatively high speed. During such high speed operation of motor 58, reels 3 and 4 are rotated in the directions indicated by the arrows on FIG. 1 with the result that leader 5*a* is peeled from the periphery of supply reel 3, guided along the tape path 5' and has its free end secured to the hub 4' of take-up reel 4 to commence the winding thereof on the take-up reel, as previously described. If such automatic threading of leader 5*a* is achieved correctly so that the opaque tape 5 arrives between light source 28 and phototransistor 29 within the predetermined time period, for example, within 20 seconds after initiation of the automatic threading operation, required for the charging of capacitors 47 and 48 up to the level at which Zener diode 49 conducts, then tape 5 interrupts the energizing of photo-transistor 29 by light from source 28 and circuit 34 causes deenergizing of relay 35. Upon deenergizing of relay 35, switches 36, 37 and 38 are returned to their normal conditions in which the movable contacts 36*a*, 37*a* and 38*a* engage the fixed contacts 36*b*, 37*b* and 38*b*, respectively. The return of switch 36 to its normal condition interrupts the circuit for energizing solenoid 40 with the result that guiding arm assembly 15 and guiding and detecting arm 25 are returned to their inoperative positions, as previously described. Although such movement of arm 25 to its inoperative position results in opening of microswitch 27, the circuit for energizing driving motor 58 is now completed through contacts 38*a* and 38*b* of switch 38 to ground. Further, the return of switch 36 to its normal condition causes power to be supplied to the recording or reproducing circuits of the VTR and the associated TV camera, in the case of a recording operation, and also to motor drive amplifier 46 with the result that the servo system for motor 58 is now operative to maintain the usual relatively slow constant speed of the motor for recording or reproducing. The return of switch 37 to its normal condition serves to connect the base of transistor 54 to ground through contacts 37*a* and 37*b* with the result that the charges on capacitors 47 and 48 are discharged through transistor 54, prior to attaining the threshold or level at which Zener diode 49 becomes conductive. Thus, switching transistors 50*a* and 50*b* remain non-conductive and control transistor 51 continues in its conductive or ON state for continuing the energizing of relay 43. Accordingly, the recording or reproducing mode of operation of the VTR is achieved, during which operation the tape being unwound from supply reel 3 is transported at a controlled speed around guide drum 6 by the cooperative action of capstan 13 and pinch roller 14 and is then rewound on take-up reel 4.

At any time during a recording or reproducing operation, actuatiokn of the "stop" pushbutton 2*a* serves to conventionally disengage the transmission for driving reels 3 and 4 from motor 58, and further serves to release the pushbutton 2*d* or 2*e* which was previously actuated to select a recording or playback operation, respectively, of the VTR with the result that pinch roller 14 is moved away from capstan 13 to interrupt the driving of the tape. Thereafter, when pushbutton 2*d* or 2*e* is actuated to renew the recording or playback operation, respectively, the transmission is again conventionally engaged for driving reels 3 and 4 from motor 58 and pinch roller 14 is urged against capstan 13 so that the driving of the tape is recommenced. Since relay 35 continues to be deenergized by reason of the opaque tape interposed between light source 28 and phototransistor 29, the circuits for energizing solenoid 40 and for charging capacitors 47 and 48 in circuit 44, respectively, remain open with the result that arms 15 and 25 of the automatic, self-threading apparatus remain in their inoperative or rest positions and relay 43 continues to be energized. Thus, the renewed recording or playback operation proceeds without interruption as described above following the automatic, self-threading operation.

When, in the course of a recording or reproducing operation, all of the tape 5 has been wound onto take-up reel 4 so that the transparent trailing portion 5*b* of the tape then comes between light source 28 and photo-transistor 29 to permit energizing of the latter with light from source 28, relay 35 is again energized to change over switches 36, 37 and 38 that is, to engage their respective movable contacts with fixed contacts 36*c*, 37*c* and 38*c*. As a result of the foregoing, power is supplied through switch 37 to circuit 45 for energizing relay 41 over a short time period, for example, for one second as previously mentioned, whereby to change over switch 42 for the same short time period during which movable contact 42*a* engages fixed contact 42*c* and causes energizing of solenoid 40. The energized solenoid 40 urges arm 25 to swing from its inoperative position toward the position shown on FIG. 1. However, by reason of the tape wound on hub 4′ of take-up reel 4, such swinging of arm 25 is blocked by the tape, and thus micro-switch 27 cannot be closed by arm 25 and remains in its open condition shown on FIG. 3. Accordingly, when relay 41 is again deenergized to restore switch 42 to its normal condition, the circuits for energizing solenoid 40 and motor 58 are opened at switch 27 and also at switdh 38 which then has its removable contact 38*a* engaged with the open-circuited contact 38*c*. Thus, the transportation of the tape is halted a short time, for example, one second, after the transparent trailing end portion 5*b* of the tape first comes between light source 28 and photo-transistor 29.

The changing over of switch 37 in response to the energizing of relay 35 further causes charging of capacitors 47 and 48 at the rate determined by those capacitors and by resistor 52. Since transparent trailing end portion 5*b* of the tape remains between light source 28 and photo-transistor 29 when driving of the tape is halted, as described above, the charge on capacitors 47 and 48 eventually exceeds the threshold level determined by Zener diode 49 so that, after a predetermined time, for example, 20 seconds following the introduction of trailing end portion 5*b* between lighth source 28 and photo-transistor 29, switching transistors 50*a* and 50*b* are made comductive or turned ON, whereby control transistor 51 is made non-conductive to cause deenergizing of relay 43. Deenergizing of relay 43 returns switch 55 to its normal condition in which movable contact 55*a* engages the open-circuited fixed contact 55*b* with the result that the supplying of power to the circuits shown on FIG. 3 is halted. Thereafter, "stop" pushbutton 2*a* may be actuated to again close switch 32 and thereby restore the VTR to its initial condition.

ABORTING OF A FAULTY AUTOMATIC, SELF-THREADING OPERATION

Since leader 5*a* is propelled or threaded along the tape path 5′ by a force applied thereto at supply reel 3 during the self-threading operation, it will be apparent that, if the leading end of leader 5*a* is caught on any one of the guide pins 7, 8, 9 and 11 or heads 10 and 12, or is otherwise obstructed in its threading movement along path 5′, serious damage to the tape, such as tearing thereof, is avoided as continued rotation of supply reel 3, without corresponding winding of the leader on take-up reel 4, is merely accompanied by loosening of the outer turns of the tape on the supply reel. Further, the extent to which the tape may be unwound from supply reel 3 without being rewound on take-up reel 4 is limited. More specifically, during an automatic, self-threading operation, as described above, if the opaque tape 5 does not arrive between light source 28 and phototransistor 29 within a predetermined time period, for example, within 20 seconds after the initiation of the self-threading operation, capacitors 47 and 48 become charged to the threshold level at which Zener diode 49 begins to conduct for turning ON switching transistors 50*a* and 50*b* and thereby making control transistor 51 non-conductive. The resulting deenergizing of relay 43 restores switch 55 to its normal condition in which movable contact 55*a* engages open-circuited contact 55*b* with the result that the supplying of power to the circuits shown on FIG. 3 is halted. Thus, motor 58 is deenergized to stop the rotation of reels 3 and 4 and of capstan 13 and thereby abort or halt a faulty or defective self-threading operation before an undesirable amount of the tape is unwound from the supply reel. The time period of 20 seconds for charging of capacitors 47 and 48 up to the threshold voltage at which Zener diode 49 is conductive is selected for the case where a normal automatic, self-threading operation requires about 7 to 8 seconds from its initiation until the time when the opaque tape 5 appears between light source 28 and photo-transistor 29.

REWIND OPERATION

At the conclusion of a recording or playback operation, as described above, rewinding of the tape from take-up reel 4 onto supply reel 3 is achieved by actuating pushbutton 2*c* which, as previously described, serves to open switch 39 and to change over switch 53 so that its movable contact 53*b* engages fixed contact 53*c*. The opening of switch 39 interrupts the circuits for supplying power to the recording and reproducing circuits of the VTR and to the TV camera that may be associated therewith, and also the circuit for energizing the motor drive amplifier 46 with the result that driving motor 58 is rotated at high speed. The change over of switch 53 disconnects capacitor 48 from its parallel circuit with capacitor 47, and thereby substantially increases the rate at which capacitor 47 will be charged up to the level at which Zener diode 49 becomes conductive when power is supplied to circuit 44. Thus, for example, capacitor 47 and resistor 52 may be dimensioned so that, when capacitor 48 is removed from the circuit, the charge level at which Zener diode 49 will conduct is achieved 5 seconds after power is supplied to circuit 44, as hereinafter described.

As the rewinding operation proceeds and substantially all of the opaque tape 5 is rewound onto supply reel 3, the transparent leader 5*a* is again interposed between light source 28 and photo-transistor 29 with the result that relay 35 is again energized to change over switches 37 and 38. The change over of switch 37 engages its movable contact 37*a* with fixed contact 37*c* so that power is supplied to circuit 44 for relatively rapidly charging capacitor 47 up to the level at which Zener diode 49 conducts to switch transistors 50*a* and 50*b* and thereby render control transistor 51 non-conductive. As a result of the foregoing, relay 43 is deenergized to return switch 55 to its original condition in which movable contact 55*a* engages the open-circuited contact 55*b*, thereby to remove power from the circuits shown on FIG. 3. During the relatively short period, for example, 5 seconds, required for charging of capacitor 47 up to the level at which Zener diode 49 conducts, the circuit for energizing motor 58 is completed to ground through contacts 53*b* and 53*c* of switch 53 so that leader 5*a* is fully rewound on supply reel 3 prior to the opening of the circuits at switch 55.

FAST FORWARD OPERATION

After the automatic, self-threading operation has been achieved by initiating either a recording or playback operation, as described above, the fast forward operation of the VTR is accomplished by actuating pushbutton 2*b* which has the effect of opening switch 39 while switch 53 remains in the position shown on FIG. 3. By reason of the opening of switch 39, the circuits for supplying power to the recording and reproducing circuits of the VTR and to the TV camera, and also the circuit for supplying power to the motor drive amplifier 46 are interrupted. Thus, motor 58 is driven at relatively high speed to effect the high speed transportation of the tape from supply reel 3 onto take-up reel 4. If the fast forward operation continues until the opaque tape 5 is fully wound on take-up reel 4, the transparent trailing end portion 5*b* of the tape comes between light source 28 and photo-transistor 29 so that relay 35 is energized to change over switches 36, 37 and 38. Since switch 39 is open, the change over of switch 36 cannot cause energizing of solenoid 40 so that arms 15 and 25 remain in their inoperative positions. The change over of switch 38 engages its movable contact 38*a* with the open-circuited contact 38*c* with the result that the circuit for energizing motor 58 is there interrupted. The change over of switch 37 again supplied power to circuit 44 for charging the parallel connected capacitors 47 and 48 at the rate determined by such capacitors and by the resistor 52. Thus, at the conclusion of the relatively longer time period, for example, 20 seconds, the charge on capacitors 47 and 48 reaches the level at which Zener diode 49 conducts with the result that switching transistors 50*a* and 50*b* are turned ON to render control transistor 51 non-conductive and thereby deenergize relay 43. As before, deenergizing of relay 43 returns switch 55 to its original condition, and thereby disconnects the circuits of FIG. 3 from the source of power.

It will be apparent from the foregoing that the apparatus according to this invention is capable of automatically effecting the self-threading of the tape in a reliable manner, and that such self-threading operation is automatically aborted or interrupted if, for any reason, the proper self-threading is not realized within a predetermined time period after its initiation. Further, the described apparatus responds to the presence of the transparent trailing end portion 5*b* of the tape, as when the tape 5 is fully wound on the take-up reel 4, in order to automatically halt a recording or playback operation or a fast forward operation which has caused the full winding of the tape on the take-up reel. It will also be seen that the described apparatus automatically cuts off the supplying of power to the circuits upon the completion of the rewinding operation.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. An apparatus for automatically threading a tape-like member having a leader extending from at least one end and being distinguishable from said tape-like member, said apparatus comprising tape drive means for transporting said leader and said tape-like member in succession along a predetermined tape path, said tape drive means being manually controllable for selectively providing at least first and second modes of transportation of said tape-like member, tape sensing means at a location adjacent said tape path for distinguishing between the presence, at said location, of said leader and said tape-like member, respectively, and providing corresponding distinctive indications, drive control means responsive to said indications provided by the sensing means for controlling said tape drive means, and timing means for determining the control of said tape drive means by said drive control means in response to said indications in dependence on at least first and second predetermined time periods, said timing means including condenser means having at least two condensers, condenser charging means operative in response to the distinctive indication from said sensing means corresponding to the presence of said leader at said location for charging said condenser means at a predetermined rate, means for connecting said two condensers in parallel with said condenser charging means when said first mode of transportation is selected so that said condenser means attains a predetermined charge level in said first time period while being charged at said predetermined rate, means for disconnecting one of said condensers from said condenser charging means when said second mode of transportation is selected so that said condenser means then attains said predetermined charge level in said second time period while being charged at said predetermined rate, means responsive to said predetermined charge level on said condenser means for determining said first and second time periods when said first and second modes of transportation are respectively selected, and means for discharging said condenser means in response to the distinctive indication from said sensing means corresponding to the presence of said tape-like member at said location.

2. An apparatus according to claim 1; in which said leader is transparent and said tape-like member is opaque, and said tape sensing means includes a light source at one side of said tape path for directing light across the latter and a photosensitive element at the other side of said tape path for receiving light from said source.

3. An apparatus according to claim 2; in which said tape-like member has a transparent portion at the end thereof remote from said leader and which is also distinguishable by said tape sensing means from said opaque tape-like member to provide a distinctive indication, and said drive control means responds to the last mentioned distinctive indication independently of said timing means.

4. An apparatus according to claim 1; in which said tape-like member has a trailing end portion remote from said leader which is also distinguishable from said tape-like member by said tape sensing means to provide a distinctive indication, and said drive control means responds to the last mentioned distinctive indication independently of said timing means.

5. An apparatus according to claim 1; in which said tape drive means includes an electric driving motor; and said drive control means includes means for driving said motor at a relatively high speed in response to the distinctive indication from said sensing means corresponding to the presence of said leader at said location, and servo means for driving said motor at a controlled relatively slower speed in response to the distinctive indication from said sensing means corresponding to the presence of said tape-like member at said location.

6. An apparatus according to claim 5; in which said drive control means includes means for deactivating said servo means upon the selection of said second mode of transportation so that said motor is driven at said relatively high speed in said second mode of transportation even when said tape-like member is at said location.

7. An apparatus according to claim 1; further comprising supply and take-up reels between which said tape path extends, and detecting means for detecting the presence of a predetermined amount of said tape-like member wound on said take-up reel; and in which said drive control means includes means responsive to the detection by said detecting means of said predetermined amount of the tape-like member on said take-up reel for deactivating said tape drive means.

8. In an apparatus for automatically threading a tape-like member in a predetermined path from a supply reel on which the tape-like member is wound to a take-up reel on which the tape-like member is to be wound, and in which said tape-like member has a leader extending from one end and being distinguishable from said tape-like member; the combination of tape drive means for transporting said leader and tape-like member in succession along said path; tape sensing means for distinguishing between the presence, at a location adjacent said path, of said leader and said tape-like member and providing first and second indications, respectively; mode selecting means for selecting operation of said tape drive means in forward and rewind directions, respectively; drive control means including means for initiating operation of said tape drive means, and means activated upon the initiation of said operation of the tape drive means for continuing said operation; and timing means energized in response to said first indication from said sensing means and being operative to deactivate said means for continuing the operation of said tape drive means in the event that said first indication persists for longer than a predetermined time period following said initiation of operation of the tape drive means, said timing means including condenser means having a plurality of condensers connected in a parallel circuit when operation of said tape drive means in said forward direction is selected, means for disconnecting at least one of said condensers from said parallel circuit when operation of said tape drive means in said rewind direction is selected, means for charging said condenser means at a predetermined rate in response to said first indication from the sensing means and for causing discharge of said condenser means in response to said second indication from the sensing means, and means responsive to a predetermined charge level on said condenser means for deactivating said means for continuing the operation of said tape drive means so that said predetermined time period is relatively long, when said operation of the tape drive means in said forward direction is selected, and relatively short, when said operation of said tape drive means in said rewind direction is selected.

9. An apparatus according to claim 8; in which said tape-like member has a trailing end portion remote from said leader and which is distinguished from said tape-like member in the same manner as said leader so that said sensing means also provides said first indication upon the presence of said trailing end portion at said location; and in which said drive control means further includes means independent of said timing means to deactivate said means for continuing the operation of said tape delivery means in response to said first indication from said sensing means by reason of said presence of said trailing end portion at said location.

10. An apparatus according to claim 9; in which said leader and trailing end portion are transparent and said tape-like member is substantially opaque; and said tape sensing means includes a light source at one side of said tape path at said location, and a photosensitive element at the other side of said path for receiving light traversing said path from said source.

11. An apparatus according to claim 8; in which said tape drive means includes an electric driving motor; and said drive control means further includes means for operating said motor at a relatively high speed in response to said first indication from said sensing means, servo means for operating said motor at a relatively slower speed in response to said second indication from said sensing means, and means for deactivating said servo means upon the selection of said rewind direction of operation of said tape drive means.

12. In an apparatus for automatically threading a tape-like member in a predetermined path from a supply reel on which the tape-like member is wound to a take-up reel on which the tape-like member is to be wound, and in which said tape-like member has a leader extending from one end and being distinguishable from said tape-like member; the combination of tape drive means for transporting said leader and tape-like member in succession along said path; tape sensing means for distinguishing between the presence, at a location adjacent said path, of said leader and said tape-like member and providing first and second indications, respectively; first relay means which is energized and deenergized in response to said first and second indications, respectively, from said sensing means, and which has at least first and second switch contacts; second relay means having first and second switch contacts; circuit means for initiating the operation of said tape drive means by way of said first and second switch contacts of said second relay means when the latter is energized; circuit means for continuing the operation of said tape drive means by way of said first switch contacts of said second relay means and said second switch contacts of said first relay means when said first and second relay means are deenergized and energized, respectively; mode selecting means for selecting operation of said tape drive means in at least a normal forward mode and a rewind mode; and timing means energized by way of said first switch contacts of said first relay means when the latter is energized and being operative to deenergize said second relay means and thereby halt the operation of said tape drive means in the event that said first indication from the sensing means persists for longer than a predetermined time period following the initiation of operation of said tape drive means, said timing means including a plurality of condensers connected in a parallel circuit when said normal forward mode is selected, means for disconnecting at least one of said condensers from said parallel circuit when said rewind mode is selected, means for charging the condensers in said parallel circuit through said first switch contacts of said first relay means when the latter is energized with the time required for said charging of the condensers to a predetermined charge level being dependent upon the number of condensers connected in said parallel circuit, and means responsive to said predetermined charge level on the condensers being charged for deenergizing said second relay means.

13. An apparatus according to claim 12; in which said first relay means has third switch contacts, and said tape drive means includes an electric driving motor operated at a relatively high speed in response to simultaneous energization of said first and second relay means; and further comprising servo means energized by way of said third switch contacts of said first relay means when the latter is deenergized for operating said motor at a relatively slower speed, and means for deenergizing said servo means when said rewind mode is selected.

14. An apparatus according to claim 12; in which said tape-like member has a trailing end portion remote from said leader and being distinguished in the same manner as the latter from said tape-like member so that said sensing means also provides said first indication when said trailing end portion is at said location to cause deenergizing of said second relay means by said timing means at the conclusion of said predetermined time period; and further comprising detecting means for detecting the presence of a predetermined amount of said tape-like member wound on the take-up reel, and means for halting the operation of said tape drive means well before the end of said predetermined time period in response to the energizing of said first relay means by said first indication from the sensing means while said detecting means simultaneously detects said predetermined amount of the tape-like member wound on said take-up reel.

* * * * *